United States Patent [19]

Iritani et al.

[11] Patent Number: 5,900,262
[45] Date of Patent: May 4, 1999

[54] FERMENTED FORMULA FEED, ITS PRODUCTION, AND USES

[75] Inventors: Satoshi Iritani; Yoshinori Sato; Hiroto Chaen; Toshio Miyake, all of Okayama, Japan

[73] Assignee: Kabushiki Kaisha Hayashibara Seibutsu Kagaku Kenkyujo, Okayama, Japan

[21] Appl. No.: 08/716,565

[22] Filed: Sep. 18, 1996

[30] Foreign Application Priority Data

Sep. 20, 1995 [JP] Japan .................................. 7-264626

[51] Int. Cl.$^6$ ............................... A23B 7/10; A21D 2/00; A21D 2/36; A21D 2/38
[52] U.S. Cl. .................................. 426/53; 426/2; 426/19; 426/54; 426/442; 426/630; 426/807; 435/267
[58] Field of Search ............................... 426/53, 54, 630, 426/2, 19, 442, 807; 435/267

[56] References Cited

U.S. PATENT DOCUMENTS

| | | | |
|---|---|---|---|
| 3,753,723 | 8/1973 | Henderson et al. | 99/9 |
| 3,968,254 | 7/1976 | Rhodes | 426/18 |
| 4,180,590 | 12/1979 | Kazuo et al. | 426/18 |
| 5,443,979 | 8/1995 | Vanderbeke | 435/195 |

FOREIGN PATENT DOCUMENTS

| | | |
|---|---|---|
| 0619369 | 10/1994 | European Pat. Off. . |
| 2-023846 | 1/1990 | Japan . |
| 6319539 | 11/1994 | Japan . |

OTHER PUBLICATIONS

Official—Methods of Analysis of the Association of Official Analytical Chemists, By Kenneth Helrich, Fifteen Edition, 1990, pp. iv–xi and 800.

Yoshihara, Ichiro, Isothermal Gas Chromatographic Analysis of Putrefactive Products in Gastrointestianl Contents and Urine Using the Same Dual Column System*, Agri. Biol. Chem., 45 (8), 1873–1875, 1981.

JP XII The Pharmacopoeia of Japan, Twelfth Edition, Official from Apr. 1, 1991, The Society of Japanese Pharmacopoeia, published 1992.

List of Cultures, Institute for Fermentation, Osaka (IFO), 1992 Microorganisms Ninth Edition, pp. v–ix, 129–130 and 141.

Official Methods of Analysis of the Association of Official Analytical Chemists, By Kenneth Helrich, Fifteen Edition, 1990, pp. iv–xiii, 86 and 87.

J. Kessler et al., "Economiser du phosphore grace a la phytase: permiers resultats chez le porc a l'engrais", vol. 24, no. 3, pp. 195–199, 1992. No Translation.

T. Anno et al., "Enzymatic elimination of phytatesa in soybean milk", vol. 32, No. 3, pp. 174–180, 1985.

G. Rimbach et al., "Enhancement of zinc utilization from phytate–rich soy protein isolate by microbial phytase", vol. 32, No. 4, pp. 308–315, 1993.

M. Matsuo, "Effects of rice bran on propierties of 'okara tempe'", vol. 64, No. 7, pp. 1237–1239, 1990.

Helander et al. 1994 Agriculture Science in Finland vol. 3 pp. 41–48, Jan. 1994.

Sigma Chemical Company Catalog 1992, Crude Phytase, pp. 1259, 815, Jan. 1992.

*Primary Examiner*—Lynette F. Smith
*Assistant Examiner*—Mary K. Zeman
*Attorney, Agent, or Firm*—Browdy and Neimark

[57] ABSTRACT

A highly digestible, good preference, relatively high-quality fermented formula feed which is obtainable by mixing a soybean feed material and a wheat splinter capable of decomposing phytin in an amount of not less than that of the soybean feed material, d.s.b., and subjecting the mixture to a lactic acid fermentation under humid conditions.

16 Claims, No Drawings

5,900,262

FERMENTED FORMULA FEED, ITS PRODUCTION, AND USES

BACKGROUND OF THE INVENTION

1. Field of the Invention

The present invention relates to a fermented formula feed, its production, and uses, more particularly, to a fermented formula feed which is obtainable by mixing a soybean feed material with a wheat splinter which is capable of decomposing phytin an amount of not less than that of the soybean feed material, on a dry solid basis (the wording "on a dry solid basis" as referred to in the present invention will be abbreviated as "d.s.b." hereinafter), and subjecting the mixture to a lactic acid fermentation under humid conditions, as well as to its production and uses.

2. Description of the Prior Art

Recently, the soybean processing industry has more flourished and is producing food materials and processed foods in quantities. As it flourishes, by-products such as a defatted soybean, soybean broth, bean curd refuse, and bean curd waste fluid, which are inevitably discharged during the processing of the above food materials and processed foods, have varied and increased rapidly in quantity. These by-products are partly used as feed materials but mostly dumped into reclaimed lands or seas as a waste, and this may result in an increase in environmental pollution.

Feed grains, which are required in livestock industries such as pig-, chicken- and cattle-raisings, and dairy farming with an enlarged management, have been imported from overseas in large quantities. In place of the feed grains, the aforesaid soybean processing by-products are expected to be used more advantageously as feed materials. However, the soybean feed materials such as a defatted soybean and bean curd refuse contain a quantity of phytin, and it is known that the utilization and the absorbability of phosphate in phytin which is incorporated in feeds are relatively poor. Since phytin inhibits the absorption of essential minerals such as calcium, iron, copper, and zinc and lowers the value of feeds, the decomposition of phytin by phytase is theoretically proposed.

In this regard, Japanese Patent Laid-Open No. 319,539/94 discloses as follows: "Phytase is an enzyme that is widely distributed in plants and microorganisms, especially, in fungi, and found in only a small amount in the bowels of monogastric animals. Plant phytase is poor in pH stability, and the pH range for exerting a catalytic activity is relatively narrow, so that it is readily inactivated in the alimentary canals of monogastric animals and less utilized by the animals. Therefore, such a plant phytase is not so useful in the preparation of formula feeds for livestock."

It has been in great demand to establish a high-quality feed having a sufficiently decomposed phytin derived from soybean feed materials, an improved phosphate utility value, and a relatively-low inhibitory activity of absorbing essential minerals, and to provide a high-quality feed with an improved storage stability which is processed from putrefactive soybean feed materials such as a soybean broth, bean curd refuse, and bean curd waste fluid.

SUMMARY OF THE INVENTION

The present invention provides a high-quality formula feed with a reduced phytin content, produced from soybean feed materials such as defatted soybeans and bean curd refuses which are discharged in large quantities as by-products in soybean processing, and provides its uses for livestock industries.

In order to overcome the above object, the present inventors studied energetically plant materials as a formula feed material, especially, the mixing of grain feed materials with other feed materials.

As a result, the present inventors unexpectedly found that a high-quality fermented formula feed with a reduced phytin content is obtainable by mixing a soybean feed material with a wheat splinter capable of decomposing phytin in an amount of not less than 1.5 folds of that of the soybean feed material, d.s.b., and subjecting the mixture to a lactic acid fermentation under humid conditions. Thus, they accomplished this invention.

DETAILED DESCRIPTION OF THE INVENTION

The present invention provides a high-quality formula feed with a reduced phytin content, produced from soybean feed materials such as defatted soybeans and bean curd refuses which are discharged in large quantities as by-products in soybean processings, and provides its uses for livestock industries.

The soybean feed materials used in the present invention include one or more materials such as a defatted soybean, soybean broth, bean curd refuse, bean curd waste fluid, waste soybean milk, waste bean curd, and soybean milk serum. The wheat splinters used in the present invention include one or more materials such as a press-ground wheat, wheat flour, low-grade flour, and wheat flour bran having phytase activity. In the present invention, the wheat splinters are mixed with the soybean materials in an amount of not less than those of the soybean feed materials, d.s.b., preferably not less than 1.5 folds of those of the soybean feed materials, d.s.b., to allow the wheat splinters to effectively decompose phytin and to improve the nutritive balance of the resulting feeds.

In the present fermented formula feed, the soybean feed materials and the wheat splinters are suitably used as an energy source for feeds and are satisfactorily incorporated into the desired feeds as much as possible. Generally, the soybean feed materials and the wheat splinters are incorporated into final products in an amount of more than 50 w/w % (the wording "w/w %" as referred to in the present invention will be abbreviated as "%" hereinafter), preferably, more than 60%, d.s.b., in total and optionally further mixed with other feed materials. The other feed materials are, for example, food industrial by-products such as a germ cake, soy sauce cake, starch wastes, sake cake, shochu cake, beer cake, beet pulp, corn gluten field, rape cake, peanut cake, fish meal, feather meal, blood powder, and milk serum; agricultural wastes such as a bagasse, corn trunk, rice straw, wheat straw, cotton seed, peanut shell, vegetable rubbish, fruit rubbish, sawdust, and bark; saccharides such as molasses, sugar, lactose, glucose, maltose, dextrin, partially saccharified starch in wheat splinters, and starch; minerals such as bone powders, salts of sodium, calcium, magnesium, phosphoric acid, iron, copper, zinc, and cobalt; and vitamins such as water-soluble vitamins and oil-soluble vitamins. A recommended timing for incorporating these other feed materials is a time before a lactic acid fermentation and, if necessary, the feed materials can be mixed after the lactic acid fermentation.

The moisture level or the humid condition for lactic acid fermentation used in the present invention ranges from a water content which allows lactic acid bacteria to ferment and one which does not allow nutritive solutions to exude from the resulting fermented formula feeds. Generally, a moisture level of about 40–90%, preferably, about 45–80% is satisfactory. To expect a higher storage stability, a relatively-low moisture level of about 45–60% is recommended. As the water sources used in the present invention, a liquid soybean broth, bean curd waste fluid, waste soybean milk, soybean milk serum, highly-humidified bean curd, and waste bean curd refuse, can be used advantageously, and optionally the water sources can be used along with an appropriate amount of water.

In the present invention, the lactic acid fermentation step is an important step to maintain the pH of formula feed materials in an acid condition, preferably, a pH of about 5 or lower where phytin decomposition by wheat splinters is effected. Actually, in the case of maintaining the temperature within the range where lactic acid bacteria can grow, i.e., a temperature of about 15–50° C., an about 0.1–5% of a seed culture of lactic acid bacteria is generally inoculated to humidified formula feeds, and the resulting mixture is either covered with plastic sheets, packed in flexible bags, or wrapped to keep the mixtures anaerobically, followed by subjecting the mixture to a lactic acid fermentation for about 2–5 days. Thus, the desired high-quality fermented formula feed is obtained.

In winter season where the ambient temperature is relatively low and lactic acid bacteria could not grow, humidified formula feeds are kept aerobically for about 1–2 days during an exothermic fermentation, and subjected to an anaerobic lactic acid fermentation to produce the desired high-quality fermented formula feeds within a relatively short period of time of an about 2–7 days.

Any inoculation method can be used in the present invention as long as it enables the inoculation of the bacteria used in the present invention: For example, the bacteria can be inoculated into one of the feed materials, then the mixtures are mixed with the remaining feed materials before a lactic acid fermentation, or the bacteria can be inoculated into a mixture of all the feed materials before a lactic acid fermentation. The lactic acid bacteria suitably used in the present invention are one or more conventional ones selected from the group consisting of those of the genera Enterococcus, Lactobacillus, Pediococcus, and Streptococcus. Especially, *Enterococcus faecium* HL-5 (FERM BP-4504), which was isolated by the present inventors and is highly resistant to heat, salt, and alkali, grows in variety conditions and can be advantageously used in a lactic acid fermentation for formula feeds using alkali-treated agricultural wastes as roughage materials.

The present fermented formula feed thus obtained has a satisfactorily decomposed phytin, inhibiting mineral absorption, and is used as a source of phosphorus that is readily absorbed and metabolized by animals. Since the fermented formula feed improves the absorption of essential minerals such as calcium, iron, copper, zinc, and cobalt in feeds, the feed can be advantageously used as a feed for monogastric animals and ruminants. The present fermented formula feed acidified with lactic acid has a relatively-high storage stability and a satisfactory taste preference. If necessary, the feed can be dried by aeration or heating to lower the moisture content below 40%, preferably, below 30%. The fermented formula feed thus obtained can be readily stored and transported to a long distance before feeding livestock. The fermented formula feed is a high-quality feed with a reduced phytin content and superior in digestibility and taste preference.

The present fermented formula feed is mainly used as a feed for monogastric animals such as pigs and poultry and advantageously used as one for ruminants after being mixed with appropriate roughage materials selected from food industrial by-products and agricultural wastes. Particularly, the fermented formula feed is suitably used as a feed with a reduced mineral absorption inhibitory activity. It can be also advantageously used as a feed for controlling the intestinal disorder and preventing infection and unsatisfactory smell of feces. Depending on the types of feeds and the ages of pigs, assuming pigs of about 80 kg body weight each, they are fed about 5–6 kg/day/head that increases the body weight by an about 0.7 kg/day/head or more, preferably, about 0.84 kg/day/head or more. The present fermented formula feed can be further mixed with other nutrients before feeding animals depending on the types and ages of the animals.

The following experiments explain the present invention in detail:

EXPERIMENT 1

Decomposition of Phytin Contained in Soybean Feed Materials by Grain Feed Materials Using grain feed materials, their activities to decompose phytin in a soybean feed material were studied. To one part by weight of a defatted soybean, d.s.b., was added 2 parts by weight of a rice bran, press-ground oat, press-ground kaoliang, press-ground sorghum, press-ground maize, press-ground wheat, low-grade flour, wheat flour, or wheat bran, and the mixture was mixed with 0.1M acetate buffer (pH 5.0) to give a water content of about 80%, allowed to react at 35° C. for 16 hours, and heated at 100° C. for 10 min to suspend the enzymatic reaction. The total content of phosphorus and the content of phytate phosphorus contained in the above each reaction mixture were measured in accordance with the method described in "*Official Methods of Analysis*", 15th edition, Nos. 964.06 and 986.11 (1990) published by the Association of Official Analytical Chemists, Inc. As a control, pre-reaction mixtures before enzymatic reactions were treated similarly as above, the total content of phosphorus and the content of phytate phosphorus contained in the resultant reaction mixtures were measured by the above method. The amount of non-phytate phosphorus was calculated by subtracting the content of phytate phosphorus from the total content of phytin. The activities to decompose phytin by the grain feed materials were evaluated by using a relative value while the content of non-phytate phosphorus in the wheat bran which had been increased after the 16 hours' reaction was regarded as 100.

The results were in Table 1.

TABLE 1

| Grain feed material | Activity to decompose phytin (Relative value) |
| --- | --- |
| Rice bran | 8 |
| Press-ground oat | 4 |
| Press-ground kaoliang | 1 |
| Press-ground sorghum | 1 |
| Press-ground maize | 2 |
| Press-ground wheat | 95 |
| Low grade flour | 97 |
| Wheat flour | 92 |
| Wheat bran | 100 |

As is obvious from the results in Table 1, phytin contained in soybean feed materials is well decomposed by wheat splinters such as a press-ground wheat, low-grade flour, wheat flour, and wheat bran among the grain feed materials.

EXPERIMENT 2

Influence of the Composition of Wheat Splinters on Decomposition of Phytin Contained in Soybean Feed Materials To effectively decompose phytin contained in soybean feed materials, the mixing ratio of soybean feed materials and wheat splinters having an activity to decompose phytin was studied. In accordance with the method in Experiment 1, a wheat bran was mixed with one part by weight of a defatted soybean in an amount of 0, 0.2, 0.5, 1.0, 1.5, 2.0 or 4.0 folds of that of the defatted soybean, d.s.b., and the mixture was mixed with 0.1M acetate buffer (pH 5.0) to give a water content of about 80%, allowed to react at 35° C. for 16 hours, and heated to suspend the enzymatic reaction in accordance with the method in Experiment 1, followed by calculating the total content of phosphorus and the content of phytate phosphorus in the resultant reaction mixture. In accordance with the method in Experiment 1, the activity to decompose phytin contained in the wheat bran was expressed with a relative value by calculating the content of non-phytate phosphorus which had been increased after 16 hours' reaction and regarding as 100 the content of non-phytate phosphorus which had been increased after 16 hours' reaction and found in the case of using 4.0 folds of the defatted soybean. The results are shown in Table 2.

TABLE 2

| Wheat bran (folds) | Activity to decompose phytin (Relative value) |
| --- | --- |
| 0 | 0 |
| 0.2 | 21 |
| 0.5 | 49 |
| 1.0 | 88 |
| 1.5 | 97 |
| 2.0 | 99 |
| 4.0 | 100 |

As is obvious from the results in Table 2, wheat splinters having an activity to decompose phytin are suitably added to soybean feed materials in an amount of not less than those of the soybean feed materials, d.s.b., preferably not less than 1.5 folds of those of the soybean feed materials, d.s.b., to effectively decompose phytin in the materials.

EXPERIMENT 3

Influence of Lactic Acid Fermentation on Formula Feeds Containing Soybean Feed Materials and Wheat Splinters 15.1 parts by weight of a bean curd refuse, 32.0 parts by weight of a bean curd waste liquid, 14.9 parts by weight of a wheat bran, 25.4 parts by weight of a low-grade flour, 5.8 parts by weight of a germ bed cake, and 5.8 parts by weight of a soy source cake were mixed well to give a water content of about 54%. One % of a seed culture of *Enterococcus faecium* HL-5 (FERM BP-4504) as a lactic acid bacterium was added to the above mixture and mixed well. Twenty kg aliquots of the mixture were packed in polyethylene bags which were then sealed hermetically to give an anaerobic condition, and subjected to a lactic acid fermentation at 25° C. for 5 days to produce a fermented formula feed having a pH of about 4. As a control, the formula feed immediately after the inoculation of the lactic acid bacteria was heated at 100° C. for 30 min, frozen, and processed into an unfermented formula feed. In accordance with the method in Experiment 1 and using these formula feeds, the total contents of phosphorus and phytate phosphorus were assayed to calculate the content of non-phytate phosphorus. The results were in Table 3.

TABLE 3

|  | Fermented formula feed of the present invention | Unfermented formula feed as a control |
| --- | --- | --- |
| Total phosphorus (%, d.s.b.) | 0.35 | 0.35 |
| Phytate phosphorus (%, d.s.b.) | 0.06 | 0.20 |
| Non-phytate phosphorous (%, d.s.b.) | 0.29 | 0.15 |

As is obvious from the results in Table 3, a high-quality feed, having a decomposed phytate phosphorus and an increased content of non-phytate phosphorus, is prepared by subjecting a mixture of soybean feed materials containing phytin and wheat splinters having an activity to decompose phytin to a lactic acid fermentation. The fermented formula feed has a relatively-long shelf life if only kept anaerobically.

EXPERIMENT 4

Effect of the Feeding of Fermented Formula Feed Both on Fattening Test and Animals' Feces Using a fermented formula feed prepared by the method in Experiment 3, pigs were tested for fattening. As a control, the unfermented formula feed prepared in Experiment 3 and "SL3" (Kaneni-Jirushi Formula Feed for Pigs), a formula feed produced by Chugoku Shiryo Goshi-kaisha, Tamano, Okayama, Japan, were used. Eighteen 5-month-old cross-breeding LW·D pigs, about 75 kg body weight on average, were divided into 3 groups consisting of 6 head, and fed for 3 weeks on 5.30 kg/day/head of the present formula feed, 5.30 kg/day/head of the unfermented formula feed, or 2.77 kg/day/head of "SL3" to allow the pigs to take 2.44 kg/day/head of either of these feeds, d.s.b. During the feeding, the pigs were allowed to intake water freely. The concentrations of ammonia and putrefactive substances in the pigs' feces 2 weeks after the initiation of the test were measured, and the pigs fed on these feeds were compared. The concentration of ammonia was determined in accordance with "Ammonium Limit Test" described in "*The Guide Book for the Pharmacopedia of Japan*", 11th edition, pp. B-7 to B-11 (1986), and the concentration of putrefactive substances was determined in accordance with the method described by Ichiro Yoshihara described in "*Agricultural Biological Chemistry*", Vol.45, No.8, pp.1,873–1,875 (1981), in a manner that the concentrations of phenol, p-cresol, 4-ethyl phenol, indole, and skatole were assayed and summed up. The results are shown in Table 4.

TABLE 4

|  | Fermented formula feed of the present invention | Unfermented formula feed as a control | Commercialized formula feed |
| --- | --- | --- | --- |
| Feed ingested (kg/pig/day) (kg by dry weight) | 5.30 (2.44) | 5.30 (2.44) | 2.77 (2.44) |
| Average of increased body weight (kg/pig/day) | 0.72 | 0.65 | 0.70 |
| Concentration of ammonia in feces (µmol/g feces) | 26.5 | 58.7 | 55.9 |
| Concentration of putrefactive substances in feces (nmol/g feces) | 778 | 1,840 | 1,753 |

As is obvious from the results in Table 4, the present fermented formula feed is superior to the unfermented formula feed as a control and has the same quality as the commercialized formula feed "SL3". The fermented formula feed has a good taste preference and a satisfactory digestibility. The data indicates that the present fermented formula feed is effectively used for feeding animals.

It was revealed that, unlike the unfermented formula feed and the commercialized formula feed "SL3", the present fermented formula feed gave lower concentrations of ammonia and putrefactive substances in the pigs' feces and controlled animals' health in a good condition. It was also found that the present fermented formula feed improved the environmental conditions in barns and prevented undesirable smell of feces. Furthermore, the dressing of the pigs fed on the present fermented formula feed revealed that the quality of meet was very satisfactory.

The following examples explain the present invention:

EXAMPLE 1

21.2 parts by weight of a bean curd refuse, 15.5 parts by weight of a bean curd waste, 10.5 parts by weight of a wheat bran, 21.0 parts by weight of a low-grade flour, 27.3 parts by weight of a germ bed cake, and 4.5 parts by weight of a soy source cake were mixed into a mixture with a moisture content of about 53%. To the mixture was inoculated a seed culture of *Enterococcus faecium* HL-5 (FERM BP-4504), then covered with a plastic sheet, and subjected to a lactic acid fermentation at ambient temperature for 3 days to obtain a fermented formula feed.

The product is a high-quality feed having a reduced phytin content, a satisfactory digestibility, and a good taste preference, and is suitably used as a feed for monogastric animals such as pigs and poultry. The product can be optionally prepared into a feed for ruminants by mixing with roughage materials such as agricultural wastes and/or other nutritive sources.

EXAMPLE 2

24.8 parts by weight of a bean curd refuse, 13.6 parts by weight of a bean curd waste fluid, 13.6 parts by weight of a wheat bran, 20.4 parts by weight of a low-grade flour, 23.7 parts by weight of an alkali-treated sawdust of broadleaf, and 3.9 parts by weight of a soy source cake were mixed to obtain a feed with a moisture content of about 52% which was then inoculated with a seed culture of *Enterococcus casseliflavus* (IFO 3531), and subjected to a lactic acid fermentation to obtain a fermented formula feed similarly as in Example 1.

The product is a high-quality feed having a reduced phytin content, a satisfactory digestibility, and a good taste preference, and is suitably used as a feed for monogastric animals such as pigs and poultry. The product can be arbitrarily prepared into a feed for ruminants after being mixed with roughage materials such as agricultural wastes and/or other nutritive sources.

EXAMPLE 3

Five parts by weight of water was added to 5 parts by weight of a low-grade flour, and the mixture was heated to gelatinize the amylaceous substances contained in the flour. The resulting mixture was mixed with 5.2 parts by weight of a wheat bran, kept at 60° C. for 16 hours to proceed the saccharification by the amylase contained in the wheat bran, and further mixed with 6 parts by weight of a defatted soybean, 10.1 parts by weight of a wheat bran, 20 parts by weight of a low-grade flour, 6.8 parts by weight of a beet pulp, 5.8 parts by weight of a beer cake, and 36.1 parts by weight of water to obtain a mixture with a moisture content of about 52%. The mixture thus obtained was inoculated with seed cultures of *Enterococcus faecalis* (IFO 3971) and *Lactobaclllus brevis* (IFO 3345), packed in a flexible bag, sealed hermetically, and subjected to a lactic acid fermentation at ambient temperature for 3 days to obtain a fermented formula feed.

The product is a high-quality feed having a reduced phytin content, a satisfactory digestibility, and a good taste preference, and is suitably used as a feed for monogastric animals such as pigs and poultry. The product can be optionally prepared into a feed for ruminants by mixing with roughage materials such as agricultural wastes and/or other nutritive sources.

EXAMPLE 4

Seventeen parts by weight of a bean curd refuse, 36 parts by weight of a bean curd waste fluid, 11 parts by weight of a wheat bran, 25 parts by weight of a low-grade flour, 6 parts by weight of a sweet potato starch waste, and 5 parts by weight of a mandarin orange waste were mixed into a mixture with a moisture content of about 53%, subjected to an aerobic exothermic fermentation for 24 hours, inoculated with a seed culture of *Enterococcus faecalis* HL-5 (FERM BP-4504), packed in a flexible bag, sealed hermetically, and allowed to ferment at ambient temperature for 5 days to obtain a fermented formula feed.

The product is a high-quality feed having a reduced phytin content, a satisfactory digestibility, and a good taste preference, and is suitably used as a feed for monogastric animals such as pigs and poultry. The product can be arbitrarily prepared into a feed for ruminants after mixed with roughage materials such as agricultural wastes and/or other nutritive sources.

EXAMPLE 5

A fermented formula feed, obtained by the method in Example 2, dried by hot air into a dry fermented formula feed with a moisture content of about 20%. The product is a high-quality feed having a reduced phytin content, a satisfactory digestibility, and a good taste preference. Because the product has a satisfactorily-high storage stability, it can be readily transported to a long distance.

As is obvious from the above results, the present fermented formula feed is obtainable by mixing a soybean feed material containing phytin with a wheat splinter capable of decomposing phytin in an amount of not less than that of the soybean feed material, preferably, in an amount of not less than 1.5 folds of that of the soybean feed material, d.s.b., subjecting the mixture to a lactic acid fermentation under humid conditions. In the fermented formula feed, phytin, which inhibits the absorption of minerals, is well decomposed to lower the phytin. Because of this, the feed does not substantially inhibit the absorption of essential minerals, has a relatively-high digestibility, and a satisfactorily-high taste preference. Therefore, the present fermented formula feed can be suitably used as a feed for monogastric animals and ruminants.

The present invention gives benefit to soybean processors, who are seeking treatment of soybean wastes, and to stock raisers who are eager for expensive feeds, and will widely influence upon grain processing, feed processing, and livestock processing industries, etc. From the global viewpoint, it is not an to state that the present invention will provide quantities of foods like livestock and milk products from food industrial wastes which have been exhausted annually and are not competed with human foods. The present invention provides a novel technology to save the earth's future facing problems such as an environmental disruption, overflowing population, and food crisis. Thus the contribution of the present invention is unfathomable.

While there has been described what is at present considered to be the preferred embodiments of the invention, it will be understood the various modifications may be made therein, and it is intended to cover in the appended claims all such modifications as fall within the true spirits and scope of the invention.

We claim:

1. In a feed for livestock comprising a feed grain, the improvement wherein said feed grain is replaced by a processed soybean feed material which is obtainable by:
   (a) mixing a soybean feed material with a wheat splinter capable of decomposing phytin in an amount of not less than 1.5 times the amount of said soybean feed material, on a dry solid basis to substantially decompose phytin in said soybean feed material in following step (b), wherein the total content of said soybean feed material and said wheat splinter is more than 50 w/w % on a dry solid basis; and
   (b) subjecting the mixture to a lactic acid fermentation at a temperature of 15–50° C. under humid conditions.

2. The livestock feed of claim 1, wherein said wheat splinter is further mixed with other feed material.

3. The livestock feed of claim 1, wherein said soybean feed material is one or more members selected from the group consisting of defatted soybean, soybean broth, bean curd refuse, bean curd waste fluid, waste soybean milk, waste bean curd, and soybean milk serum, and said wheat splinter is one or more members selected from the group consisting of press-ground wheat, wheat flour, low-grade flour, and wheat flour bran.

4. The livestock feed of claim 2, wherein said other feed material is one or more members selected from the group consisting of food industrial by-products, agricultural waste products, saccharides, minerals, and vitamins.

5. The feed for livestock according to claim 1, wherein the humid condition in step (b) is about 40–90% of water.

6. The feed for livestock according to claim 1 wherein the moisture content of the feed is below w/w %.

7. A process for preparing a livestock feed, said process consisting essentially of:
   (a) mixing a soybean feed material with a wheat splinter having an activity to decompose phytin in an amount of not less than 1.5 folds of that of said soybean feed material, on a dry solid basis, to substantially decompose phytin in said soybean feed material in following step (b), wherein the total content of said soybean feed material and said wheat splinter is more than 50 w/w % on a dry solid basis; and
   (b) subjecting the mixture to a lactic acid fermentation at a temperature of 15–50° C. under humid conditions.

8. The method according to claim 7 wherein the moisture content of the feed is below 40 w/w %.

9. The process of claim 7, wherein said wheat splinter is further mixed with other feed material.

10. The process of claim 9, wherein said other feed material is one or more members selected from the group consisting of food industrial by-products, agricultural waste products, saccharides, minerals, and vitamins.

11. The process of claim 7, wherein said lactic acid fermentation is an anaerobic lactic acid fermentation or an anaerobic lactic acid fermentation following an aerobic exothermic fermentation.

12. The process of claim 7, wherein said lactic acid fermentation comprises a step of inoculating one or more spices of lactic acid bacteria selected from the group consisting of those of the genera Enterococcus, Lactobacillus, Pediococcus, and Streptococcus.

13. The process of claim 12, wherein said lactic acid bacterium belonging to the genus Enterococcus is *Enterococcus faecium* HL-5 (FERM BP-4504).

14. The process of claims 7, wherein said livestock feed is a feed for monogastric animals and/or ruminants.

15. The process of claim 7, wherein the total content of said soybean feed material and said wheat splinter is more than 50 w/w %, on a dry solid basis.

16. The process of claim 7, wherein said humid condition in step (b) is about 40–90 w/w % of water.

* * * * *